Oct. 11, 1932.  S. HYNES  1,881,611
FRUIT WASHER
Filed Jan. 19, 1931  2 Sheets-Sheet 1
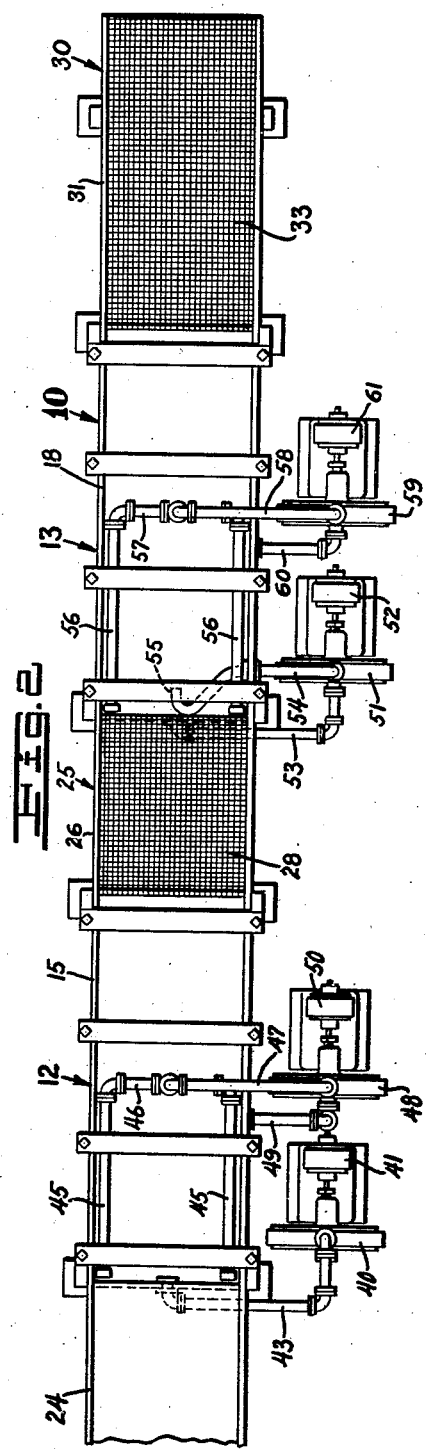
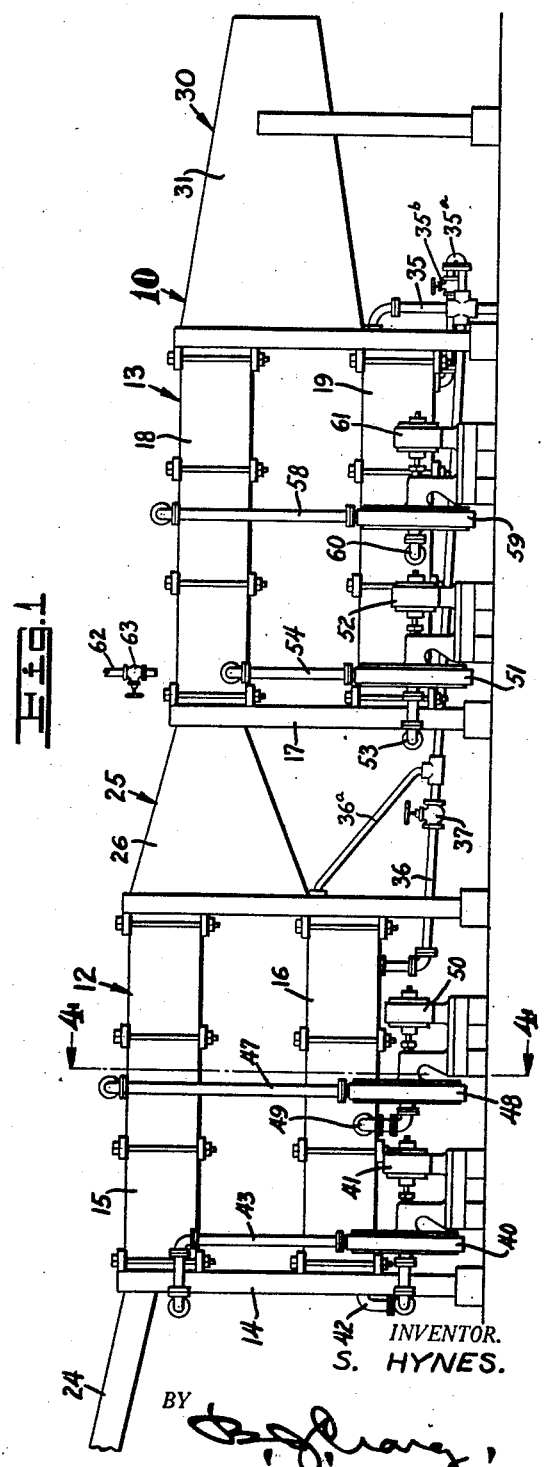
INVENTOR.
S. HYNES.
BY
ATTORNEY.

Oct. 11, 1932.    S. HYNES    1,881,611
FRUIT WASHER
Filed Jan. 19, 1931    2 Sheets-Sheet 2
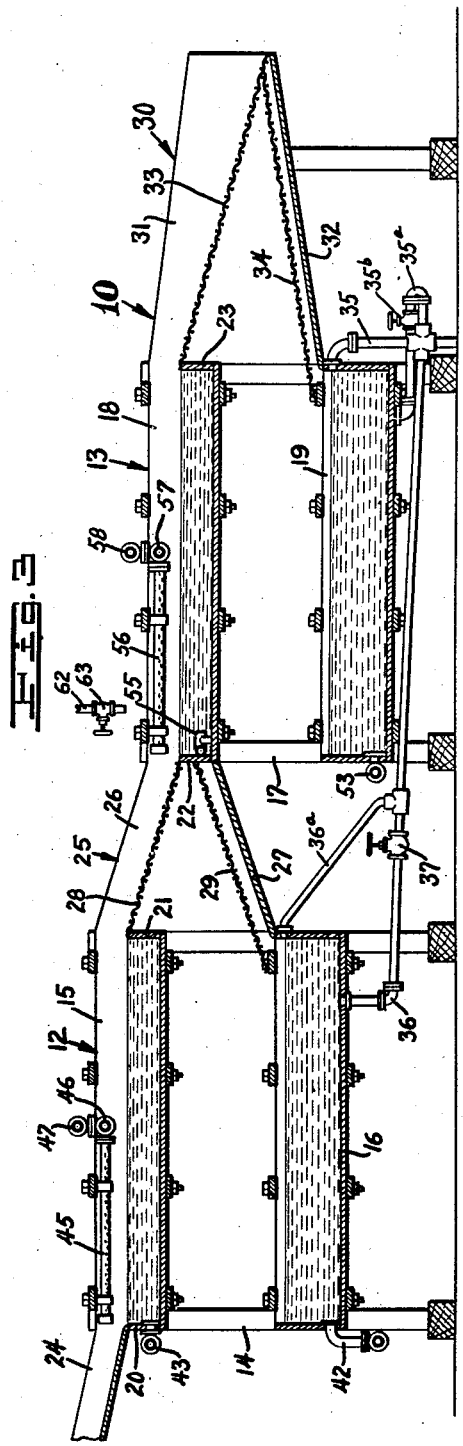
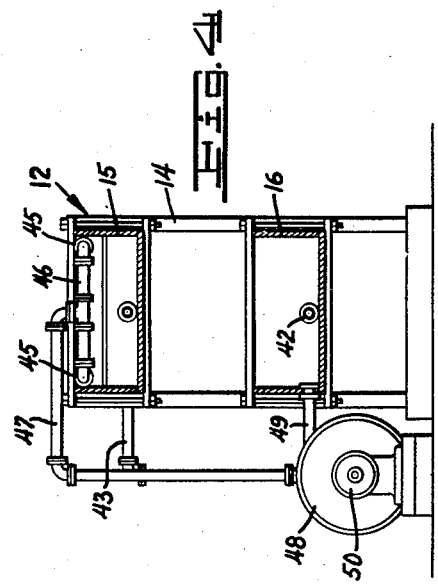
INVENTOR.
S. HYNES.
BY
ATTORNEY.

Patented Oct. 11, 1932

1,881,611

UNITED STATES PATENT OFFICE

SYLVANUS HYNES, OF CANON CITY, COLORADO

FRUIT WASHER

Application filed January 19, 1931. Serial No. 509,752.

This invention relates to fruit washers.

The general object of the invention is to provide an improved device for washing fruit and more particularly for washing apples.

Another object of the invention is to provide a fruit washer to dissolve poison sediment and to clean the fruit wherein the fruit is first cleaned by an acid solution and then rinsed in fresh water and wherein a novel means is provided for transferring the fruit from the acid bath to the rinsing bath.

A further object of the invention is to provide a fruit washer including a fluid tank wherein the fruit is conveyed from one end of the tank to the other by fluid means and forced out of the tank by fluid means.

Other objects and advantages of this invention will be apparent from the following description taken in connection with the accompanying drawings wherein:

Fig. 1 is a side elevation of my improved fruit washing device.

Fig. 2 is a top plan view of the device shown in Fig. 1.

Fig. 3 is a longitudinal section through the fruit washer and

Fig. 4 is a section taken on line 4—4 of Fig. 1.

Referring to the drawings by reference characters I have indicated my improved fruit washing device generally at 10. As shown the device 10 comprises an acid solution section 12 and a rinsing section 13. The acid solution section 12 comprises a supporting frame 14 on which is mounted a fluid tank 15 with a fluid reservoir 16 therebelow.

The rinsing section 13 comprises a supporting frame 17 on which is mounted a fluid tank 18 with a fluid reservoir 19 therebelow. The frames and tanks may be of any suitable construction and of a size suitable for each installation.

The opposite ends 20 and 21 of the tank 15 are lower than the side walls of the tank and the opposite ends 22 and 23 of the tank 18 are lower than the side walls of the tank 18 while upper edges of the ends 22 and 23 of the tank 18 are positioned below the upper edges of the ends 20 and 21 of the tank 15 as clearly shown in Fig. 3.

Extending into the tank 15 over the end 20 I provide a fruit feeding chute 24 and between the sections 12 and 13 I provide a connecting chute 25 which includes sides 26 and a bottom 27. The bottom 27 of the chute 25 is inclined downwardly from a point adjacent the bottom of the fluid tank 18 to the top of the fluid reservoir 16 so that any fluid which splashes or drains into the chute 25 will drain into the reservoir 16.

Extending from the top edge of the end 21 of the tank 15 and inclined downwardly to the top edge of the end 22 of the tank 18 I provide a screen, wire mesh or slotted member 28 and spaced from the bottom 27 of the chute 25 and similarly inclined I provide a screen, wire mesh or slotted member 29.

Extending from the end of the section 13 opposite the connecting chute 25 I provide a fruit delivery chute 30 which includes sides 31 and a bottom 32. The outer end of the bottom 32 is below the end 23 of the tank 18 and above the reservoir 19 and inclines downward towards the reservoir so that any fluid in the discharge chute 30 will drain into the reservoir 19. Extending from the upper edge of the end 23 of the tank 18 and inclined downward to the outer end of the bottom 32 of the discharge chute 30 I provide a screen or wire mesh member 33 and spaced from the bottom 32 and similarly inclined I provide a screen or wire mesh member 34.

The reservoir 19 is provided with an overflow pipe 35 and a drain pipe 35a which communicates with the overflow pipe and is provided with a control valve 35b.

The reservoir 16 is provided with a drain pipe 36 which communicates with the overflow pipe 35 and is provided with a control valve 37. The reservoir 16 is also provided with an overflow pipe 36a which communicates with the drain pipe 36.

For drawing fluid from the reservoir 16 and delivering it into the tank 15 to create a flow of fluid therein I provide a fluid pump 40 which is shown as driven by an electric motor 41. Fluid is drawn from the reservoir 16 through a pipe 42 to the pump 40 and delivered from the pump to the tank 15 through a pipe 43 which enters the tank through the end 20 intermediate the sides of the tank. When the reservoir 16 and the tank 15 contain fluid and the pump 40 is operating the fluid forced through the pipe 43 creates a flow of fluid in the tank 15 from the end 20 towards the end 21, thence the fluid surges over the end 21 into the connecting chute 25 and is directed back into the reservoir 16.

Adjacent each side of the tank 15 and extending from adjacent the chute 24 towards the opposite end for a portion of the length of the tank I provide spray pipes 45 which are perforated on their under sides and connected by a transverse pipe 46. The transverse pipe 46 communicates with a pipe 47 which extends to the discharge of a fluid pump 48, the intake of which is connected by a pipe 49 to the reservoir 16. The pump 48 like the pump 40 is shown as driven by an electric motor 50.

For drawing fluid from the reservoir 19 and delivering it to the tank 18 I provide a fluid pump 51 which is shown as adapted to be driven by an electric motor 52. Fluid is drawn from the reservoir 19 through a pipe 53 to the pump 51 and delivered from the pump to the tank 18 through a pipe 54 which enters the tank through the one side thereof and extends to the center of the tank where it is bent to discharge fluid towards the end 23 as indicated at 55. When the reservoir 19 and the tank 18 are filled with fluid and the pump 51 is operating the fluid forced through the pipe 54 creates a flow in the tank towards the end 23. The fluid then surges over the end 23 into the discharge chute 30 and is directed back into the reservoir 19.

Adjacent each side of the tank 18 and extending from adjacent the end 22 towards the opposite end for a portion of the length of the tank I provide spray pipes 56 which are perforated on their under sides and connected by a transverse pipe 57. The transverse pipe 57 communicates with a pipe 58 which extends to the discharge of a fluid pump 59, the intake of which is connected by a pipe 60 to the reservoir 19. The pump 59, like the pump 51, is shown as adapted to be driven by an electric motor 61.

Fresh water may be continually supplied to the rinsing section 13 by a pipe 62 having a control valve 63 thereon which is preferably positioned to discharge into the tank 18 adjacent the end 22 thereof.

When the device 10 is used to wash apples the tank 15 and the reservoir 16 are filled with an acid solution and the tank 18 and the reservoir 19 are filled with fresh water for rinsing.

When apples are being washed a solution of hydrochloric acid in water or any other desired acid solution having a solvent effect upon the substance with which the fruit has been sprayed is used.

In operation the apples are delivered to the tank 12 by the chute 24 and are propelled by the flow of fluid from the pipe 43 towards the discharge end 21 of the tank. As the apples pass by the spray pipes 45 the portions of the apples are sprayed by the fluid from the apertures in the spray pipes which are arranged to thoroughly spray over the entire surface of the rear end of the tank 12. The flow of fluid in the tank causes the apples to roll about and this agitation although not bruising the fruit causes the entire surface of all the apples to be thoroughly treated with the acid solution in the tank. This action of the acid solution against the surfaces of the fruit both mechanically and by friction of the solution and chemically by acid causes the poison sediment on the fruit to dissolve leaving the surface of the fruit unharmed.

When the apples reach the end 21 of the tank 15 the fluid surging over the end 21 carries the apples over the upper edge of the end 21 onto the screen 28 in the connecting chute 25. The apples then roll down the screen 28 and are delivered into the rinsing tank 18. The flow of fluid from the pipe 54 then propels the apples towards the discharge end 23 of the tank 18. As the apples pass by the spray pipes 56 they are sprayed by the fluid emitting therefrom and the flow of fluid in the tank retains the apples in a rolling or agitated condition so that the apples are thoroughly rinsed of any of the acid solution from the tank 16 which has not drained therefrom so that by the time the fruit reaches the end 23 of the tank 15 the fruit is in condition for drying. When the apples reach the end 23 of the tank 15 the fluid surging over the end 23 carries the apples over the upper edge of the end 23 onto the wire mesh or screen 33 in the discharge chute 30. The apples then roll down the screen 33 to a suitable container or onto a conveyor.

With my invention a thorough cleaning of the fruit is obtained. As the fruit passes down the discharge tank the rolling action causes the acid solution on the fruit to drain back into the acid tank whereby a minimum of acid solution passes to the rinsing tank. Further, the rolling action causes the fruit to be bounced whereby it is thoroughly drained and cleaned.

The hydraulic jets which propel the fruit through the tanks cause the fruit to bounce about and to rise so that the full effect of the downwardly directed spray is obtained and thus the fruit is thoroughly cleaned without injury and without impairment of its keeping qualities.

From the foregoing description it will be apparent that I have invented a fruit washing machine which is highly efficient in use and which can be economically manufactured.

Having thus described my invention, I claim:

1. In a fruit washer, an acid solution section and a rinsing section, said acid solution section including a supporting frame having a fluid tank thereon and a fluid reservoir below said fluid tank, means to direct articles into said tank, means to draw fluid from said reservoir and discharge it into said tank, said fluid being discharged into said tank adjacent the article entering end thereof and being directed towards the opposite end of said tank to create a flow of fluid in said tank, spray pipes adjacent the entrance end of said tank and spaced above the fluid level therein, means to draw liquid from said reservoir and discharge it through said spray pipes, said rinsing section including a supporting frame having a fluid tank thereon and a fluid reservoir below said tank, the fluid level in said rinsing tank being below the fluid level in said acid tank, a connecting chute between said acid solution section and said rinsing section, said chute including side members and a bottom, a screen member in said chute, said screen member extending from the discharge end of said acid tank and being inclined downward to said rinsing tank, said chute bottom being inclined downward from said rinsing tank to said acid reservoir and draining thereinto.

2. In a fruit washer, an acid section and a rinsing section, said acid section including a tank and a fluid reservoir below said tank, means to draw fluid from said reservoir and discharge it into said tank towards one end of said tank to create a flow of fluid in said tank, spray pipes adjacent the entrance end of said tank and spaced above the fluid level therein, means to draw liquid from said storage tank and discharge it through said spray pipes, said rinsing section including a fluid tank and a fluid reservoir below said tank, the fluid level in said rinsing tank being below the fluid level in said acid tank, a connecting chute between said acid solution section and said rinsing section, a screen member in said chute and extending from the discharge end of said acid tank and being inclined downward to said rinsing tank, said chute having a bottom inclined downward from said rinsing tank to said acid reservoir and draining thereinto, the fluid in said acid tank being adapted to surge over the discharge end of said acid tank carrying articles in said acid tank over said discharge end and depositing them on said screen member in said connecting chute and said fluid being directed into said acid reservoir by the bottom of said chute, means to draw fluid from said rinsing reservoir and discharge it into said rinsing tank towards the discharge end of said rinsing tank to create a flow of fluid therein, spray pipes adjacent the entrance end of said rinsing tank and spaced above the fluid level therein, means to draw water from said rinsing reservoir and discharge it through said spray pipes, a discharge chute extending from the exit end of said rinsing tank, said chute including side members and a bottom, the outer end of said chute bottom member being positioned below the fluid level in said rinsing tank and above the fluid level in said rinsing reservoir and being inclined downward towards said reservoir and draining thereinto, the fluid in said rinsing tank being adapted to surge over the discharge end of said tank carrying with it articles in said tank and discharging them into said discharge chute.

3. In a fruit washer, an acid solution section and a rinsing section, said acid solution section including a supporting frame having a fluid tank thereon and a fluid reservoir below said fluid tank, means to direct articles into said tank, means to draw fluid from said reservoir and discharge it into said tank, said fluid being discharged into said tank adjacent the article entering end thereof and being directed towards the opposite end of said tank to create a flow of fluid in said tank, spray pipes adjacent the entrance end of said tank and spaced above the fluid level therein, means to draw liquid from said storage tank and discharge it through said spray pipes, said rinsing section including a supporting frame having a fluid tank thereon and a fluid reservoir below said tank, the fluid level in said rinsing tank being below the fluid level in said tank, a connecting chute between said acid solution section and said rinsing section, said chute including side members and a bottom, a screen member in said chute, said member extending from the discharge end of said acid tank and being inclined downward to said rinsing tank, said chute bottom being inclined downward from said rinsing tank to said acid reservoir and draining thereinto, means to draw fluid from said rinsing reservoir and discharge it into said rinsing tank adjacent the article entrance end thereof and said fluid being directed towards the opposite end of said rinsing tank to create a flow of fluid therein, spray pipes adjacent the entrance end of said rinsing tank and spaced above the fluid level therein, means to draw water from said rinsing reservoir and discharge it through said spray pipes, a discharge chute extending from the exit end of said rinsing tank, said chute including side members and a bottom, the outer end of said chute bottom being positioned below the fluid level in said rinsing tank and above the fluid level in said rinsing reservoir and being inclined downward towards said reservoir and draining thereinto, and a screen member in said discharge chute and inclined downward from said rinsing tank towards the outer end of said discharge chute.

In testimony whereof, I hereunto affix my signature.

SYLVANUS HYNES.